United States Patent
Peisa et al.

(10) Patent No.: US 8,200,228 B2
(45) Date of Patent: Jun. 12, 2012

(54) READING NEIGHBORING CELL SYSTEM INFORMATION

(75) Inventors: Janne Peisa, Espoo (FI); Vera Vukajlovic, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 363 days.

(21) Appl. No.: 12/664,363

(22) PCT Filed: Jun. 12, 2008

(86) PCT No.: PCT/SE2008/050711
§ 371 (c)(1),
(2), (4) Date: Dec. 11, 2009

(87) PCT Pub. No.: WO2008/153500
PCT Pub. Date: Dec. 18, 2008

(65) Prior Publication Data
US 2010/0222006 A1  Sep. 2, 2010

Related U.S. Application Data

(60) Provisional application No. 60/944,293, filed on Jun. 15, 2007.

(51) Int. Cl.
*H04W 36/00* (2009.01)
*H04W 72/00* (2009.01)
*H04W 4/00* (2009.01)
*H04B 7/00* (2006.01)

(52) U.S. Cl. ........ 455/438; 455/436; 455/524; 455/525; 455/452.2; 370/331; 370/332

(58) Field of Classification Search .................. 455/438, 455/436, 452.2, 524, 525; 370/331, 332
See application file for complete search history.

(56) References Cited

U.S. PATENT DOCUMENTS

| | | | | |
|---|---|---|---|---|
| 5,953,320 | A * | 9/1999 | Williamson et al. | 370/252 |
| 6,975,608 | B1 * | 12/2005 | Park et al. | 370/332 |
| 7,496,073 | B2 * | 2/2009 | Tiedemann, Jr. | 370/332 |
| 8,089,938 | B2 * | 1/2012 | Bosch et al. | 370/332 |
| 2003/0081571 | A1 * | 5/2003 | Hur | 370/331 |
| 2005/0239471 | A1 | 10/2005 | Babovic | |
| 2006/0034229 | A1 * | 2/2006 | Joo et al. | 370/335 |
| 2006/0193274 | A1 * | 8/2006 | Yamagata | 370/310 |
| 2007/0032237 | A1 * | 2/2007 | Chang et al. | 455/436 |
| 2007/0149193 | A1 * | 6/2007 | Chong | 455/435.2 |
| 2007/0173194 | A1 * | 7/2007 | Vare et al. | 455/3.04 |
| 2008/0062906 | A1 * | 3/2008 | Baker et al. | 370/315 |
| 2008/0080399 | A1 * | 4/2008 | Wang et al. | 370/254 |
| 2009/0233600 | A1 * | 9/2009 | Johansson et al. | 455/435.2 |

OTHER PUBLICATIONS

3rd Generation Partnership Project. "Consideration on One-to-All Qoffset." 3GPP TSG RAN @G2 #57bis, Tdoc-R2-071296, St. Julian's, Malta, Mar. 26-30, 2007.

(Continued)

*Primary Examiner* — Marivelisse Santiago Cordero
*Assistant Examiner* — Mong-Thuy Tran
(74) *Attorney, Agent, or Firm* — Coats & Bennett, P.L.L.C.

(57) ABSTRACT

A base station indicates to mobile stations as to whether specific offsets apply for use when measuring a signal strength of base stations in neighboring cells. Additionally, if the neighboring cells do use offsets, the present invention may indicate as to whether the neighboring cell offsets are the same as the current serving cell offset.

15 Claims, 6 Drawing Sheets

OTHER PUBLICATIONS

3rd Generation Partnership Project. "Operator's View on Neighbour Cell Information." 3GPP TSG RAN WG2 #58, Tdoc-R2-072010, Kobe, Japan, May 7-11 2007.

3rd Generation Partnership Project. "LTE Mobility Consideration." 3GPP TSG-RAN Meeting #36, RP-070464, Busan, Korea, May 29-Jun. 1, 2007.

* cited by examiner

READING NEIGHBORING CELL SYSTEM INFORMATION

RELATED APPLICATIONS

This application claims priority from U.S. Provisional Application Ser. No. 60/944,293, which is entitled "Reading Neighboring Cell System Information." That provisional application was filed with the U.S. Patent and Trademark Office on Jun. 15, 2007 and is incorporated herein by reference in its entirety.

TECHNICAL FIELD

The present invention relates generally to wireless communication networks, and particularly to reading neighboring cell system information message in wireless communication networks.

BACKGROUND

Wireless communication networks comprise a plurality of cells, each of which is covered by a base station (BS). With most networks, the base stations perform the mobility management functions that allow a given piece of User Equipment (UE), such as a mobile station (MS), to move between cells. Generally, each base station in each cell transmits a unique beacon or pilot signal. The mobile stations use these signals to identify the base stations and to measure the signal strength from each base station. The mobile stations then send this information to the base stations. Based on this information, the base stations make mobility decisions regarding which cell or cells should be used to support communications with a given mobile station.

Typically, each cell transmits a neighbor list to help the mobile stations identify new cells as it moves through the network. These neighbor lists exist in networks such as Global System for Communications (GSM) networks and Universal Mobile Telecommunications System (UMTS) networks. However, other communication networks may not employ neighbor lists. By way of example, Evolved-UMTS Terrestrial Radio Access Networks (E-UTRAN), also referred to as Third Generation Partnership Project UMTS Long Term Evolution (3GPP LTE) networks, will make neighbor list use optional. Therefore, these types of networks may need to rely on a mobile station's ability to detect cells without neighbor lists. There is a variety of ways to accomplish this.

With LTE networks, for example, the radio multiplexing method is based on Orthogonal Frequency Division Multiplexing (OFDM). Enhanced UMTS Terrestrial Radio Access Networks (E-UTRAN), which are "Re-Use One" systems, employ a similar approach. Re-use One systems are those in which each cell in the network uses the same frequency as it's neighbor cell (e.g., the same set of sub carriers in OFDM). This means that in LTE networks, the mobile stations will be able to read/receive signals transmitted by a given neighbor cell while the mobile station is located in another cell. However, interference from the current cell might be high.

With mobile station-based mobility in UTRAN networks, for example, the mobile station will read the neighbor list from system information message received from the mobile station's current cell. When the mobile station detects that another cell is better than its current cell (e.g., based on specific criteria defined in the standard and by parameters also sent on system information message), the mobile station will select the new cell if that cell is defined as a neighbor in the neighbor list. Depending on which Radio Resource Control (RRC) state the mobile station is in, the mobile station may send an update message to the network to indicate that it has moved to a new cell or state. If the mobile station is in the RRC IDLE state, it will not send any messages to the Radio Access Network (RAN) indicating a new location.

For network-controlled mobility, a mobile station normally gets a neighbor cell list from the network in a dedicated message. Based on conditions and criteria defined by the standard, as well as by parameters sent from the network, the mobile station triggers a measurement report for transmission to the network whenever it detects a neighbor cell. The network will use the content in the measurement report to determine whether the mobile station should be handed off to the new cell. If so, a handover message is sent to the mobile station ordering it to connect to the new cell. After handover, the network usually updates the mobile station's neighbor list to reflect the identities of the neighboring base stations of this new cell.

There are three main categories of neighbor cells. These are intra-frequency neighbors (i.e., when the neighbor cell center frequency falls within the mobile station reception bandwidth), inter-frequency neighbors (i.e., when the neighbor cell center frequency falls outside the mobile station's reception bandwidth, and inter-RAT neighbors (i.e., when the neighbor cell uses an access technology that is different from the access technology employed by the currently-serving cell.

The fact that E-UTRAN is a Re-use One system reduces the need to have neighbor lists listing explicit neighbors, as is done in GSM communication networks. For example, the mobile station will detect strong signals from neighbor cells having favorable radio conditions especially for the current frequency. The base stations in these cells, then, would become candidates for handover or cell-reselection.

Therefore, E-UTRAN networks rely on the mobile station for both mobile station-based and network-controlled mobility. Particularly, these networks rely on the mobile station to detect a set of neighboring cells. Existing technology also allows the mobile stations to apply specific parameter settings when performing a re-selection or a handover to certain cells. With GSM and UMTS networks, the parameters to be used by mobile stations are included as a part of the neighbor list.

The parameters required for E-UTRA networks are similar to those contained in the neighbor lists. Thus, for mobile station-based mobility, the parameters may be included in an optional neighbor list broadcast as a part of the current cell System information message. For network-controlled mobility, the parameters may be included in a dedicated Measurement Configuration message. Alternatively, each cell may broadcast its own specific parameters. The mobile station then reads neighboring cell system information message to acquire any specific parameters needed to effect handover to that cell.

SUMMARY

The present invention provides indications to User Equipment (UE) such as a Mobile Station (MS) as to whether specific offsets apply for use when measuring the signal strength of base stations in neighboring cells. Additionally, if the neighboring cells do use offsets, the present invention may provide indications as to whether the neighboring cell offsets are the same as the current serving cell offset.

In one embodiment, a base station in a serving cell of a wireless communication network comprises a controller and a transceiver. The controller determines whether a base station in a neighboring cell transmits a signal strength measurement offset to an MS. Based on that determination, the transceiver transmits a first indicator to the MS to indicate whether a specific offset applies for use when measuring the signal strength of the neighboring base station. In some embodiments, the controller may also determine whether the offset used in the neighboring cell is the same as that used in the serving cell. If so, the transceiver may transmit a second indicator to the MS indicating that the two offsets are the same.

The MS also comprises a controller and a transceiver. The MS transceiver receives the first and second indicators from the serving base station if they are sent. If the first indicator indicates that a signal strength measurement offset applies for the neighboring cell, the MS controller will acquire the signal strength measurement offset from the neighboring base station. Otherwise, the MS controller will skip the acquisition of a signal strength measurement offset from the neighboring base station. If the second indicator indicates that the same offsets apply to both the serving cell and the neighboring cell, the MS will re-use the offset obtained for the serving cell to perform signal strength measurements in the neighboring cell.

DETAILED DESCRIPTION

In one embodiment of the present invention, a base station in a serving cell indicates to User Equipment (UE), such as a Mobile Station (MS), whether specific signal strength measurement offsets apply to base stations in neighboring cells. Additionally, if the neighboring cells use offsets, the serving base station may provide an indication whether the neighboring cell offsets are the same as the serving cell offset.

Providing an indication whether offsets do or do not apply to neighboring cell signal strength measurements allows the MS to avoid unnecessary acquisition of neighboring cell information. Absent such indicators, the MS in a current cell must acquire the Broadcast Channel (BCH) or other information-bearing channel in each neighboring cell to determine whether a measurement offset should be used for that cell. Performing these functions may cause the MS to expend its resources unnecessarily. With the indicators of the present invention, the current cell can indicate that offsets do not apply to any of the neighboring cells. Additionally, the current cell can indicate that one or more neighboring cells employ the same offset as does the current cell. Thus, the MS need not expend the time and power it otherwise would in reading neighboring cell information. In other words, indicating whether specific offsets do or do not apply to neighbor cells allows the MS to avoid unnecessary reading of neighboring cells' broadcast channels.

Figure 1:
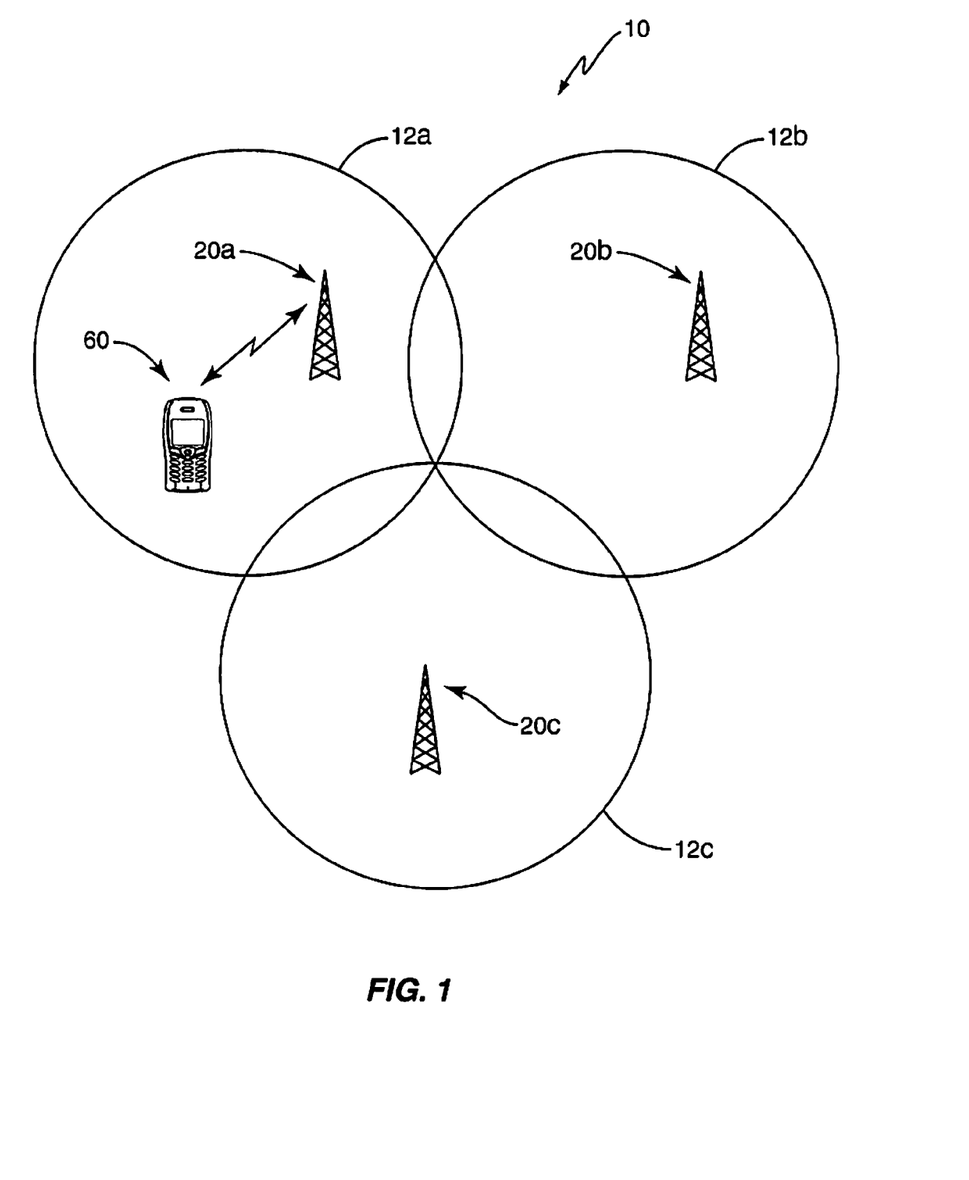
FIG. 1 illustrates some of the components of a wireless communication network suitable for use in one embodiment of the present invention.

FIG. 1 illustrates an overview of a wireless communication network suitable for use in one embodiment of the present invention. Although the network may be any communication network known in the art, the network shown in FIG. 1 comprises an LTE Radio Access Network (RAN) 10. The architecture of the LTE RAN 10 is well known in the art, and thus, not described in detail here. However, a brief description of the LTE RAN 10 and its nodes is included herein for clarity.

The LTE RAN 10 employs only one type of node—a base station (BS) 20 which is also called the eNodeB. Each BS 20 serves one or more Mobile Stations (MSs) 60 in one or more cells 12. In operation, each BS 20 performs the typical physical-layer functions required for communication with the MSs 60. Such functions include, but are not limited to, encoding/decoding, modulation/demodulation, and interleaving/de-interleaving. In addition, the BS 20 may, in some cases, perform the classical Radio Network Controller (RNC) functions, thereby effecting decisions regarding handover, radio resource allocation, and scheduling decisions for both uplink and downlink communications.

Figure 2:
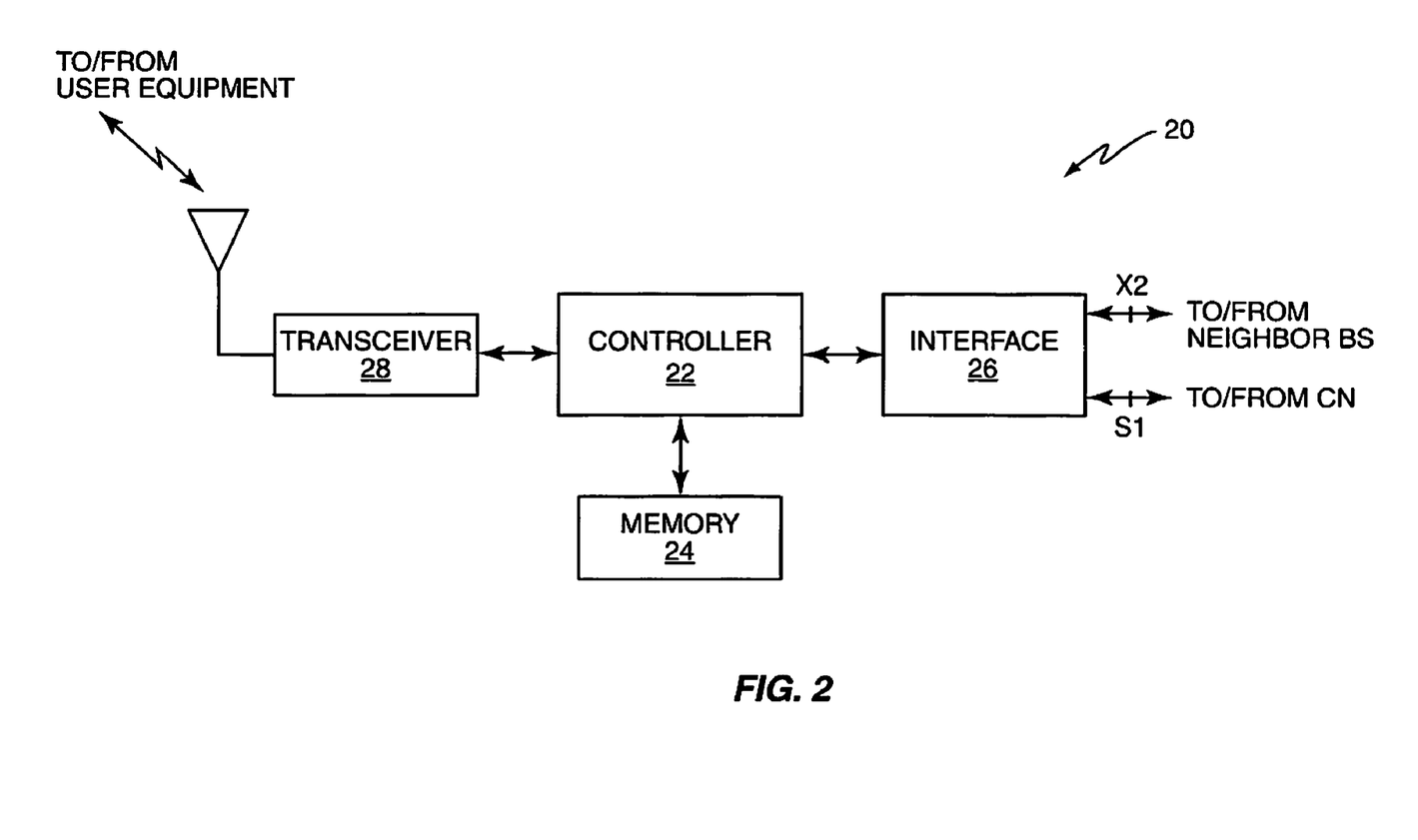
FIG. 2 is a block diagram illustrating some of the components of a base station configured to operate according to one embodiment of the present invention.

FIG. 2 illustrates some of the components of a BS 20 configured to operate according to one embodiment of the present invention. As seen in FIG. 2, BS 20 comprises a controller 22, memory 24, a communication interface 26, and a transceiver 28 connected to an antenna. Controller 22, which may comprise one or more microprocessors, controls the operation of BS 20 according to instructions and data stored in memory 24. Interface 26 enables the BS 20 to communicate with a Core Network (not shown) via an IP-based S1 interface (not shown) that carries both user traffic and signaling data between the BS 20 and the Core Network, and with neighboring base stations via an X2 interface. Generally, the X2 carries signaling data to support active-mode mobility, but may also convey signaling, and Operations and Management (O&M) data to support radio resource management functions between the cells 12. The transceiver 28 facilitates wireless communications between the MSs 60 and the serving BS 20 via an antenna.

To perform signal strength measurements (e.g., for the current cell and one or more neighboring cells), the MS 60 will need to read the information broadcast by the neighbor BSs 20 in the neighboring cells 12 to acquire any signal strength measurement offsets used by those BSs 20. Typically, the neighboring BSs 20 broadcast their signal strength measurement offsets to the MSs 60 every 40 ms over their Broadcast Control Channels (BCHs). Upon receipt, the MSs 60 use the offset to perform signal strength measurements of the BSs 20. The MS 60 will then rank the cells it measures based on these measurements and use this information for handover functions.

Acquiring the signal strength measurement offsets for each of the different network cells 12 can create delays. Particularly, the MS 60 could have to acquire and read the offset information from each neighbor cell. Therefore, the present invention provides an indication to the MSs 60 whether signal strength measurement offsets do or do not apply to the BSs 20 in neighboring cells 12. Particularly, the controller 22 of the serving BS 20 generates and sends an indicator to the MS 60 to indicate whether specific signal strength measurement offsets apply to the neighboring BSs 20. If so, the controller 22 may also generate and send an indicator to indicate whether those offsets are the same as the offset for the MSs 60 current cell. Providing such indicators to the MSs 60 avoids the need for the MSs 60 to read the broadcast channels of neighboring cells 12 to determine whether a measurement offset should be used for that cell.

Figure 3:
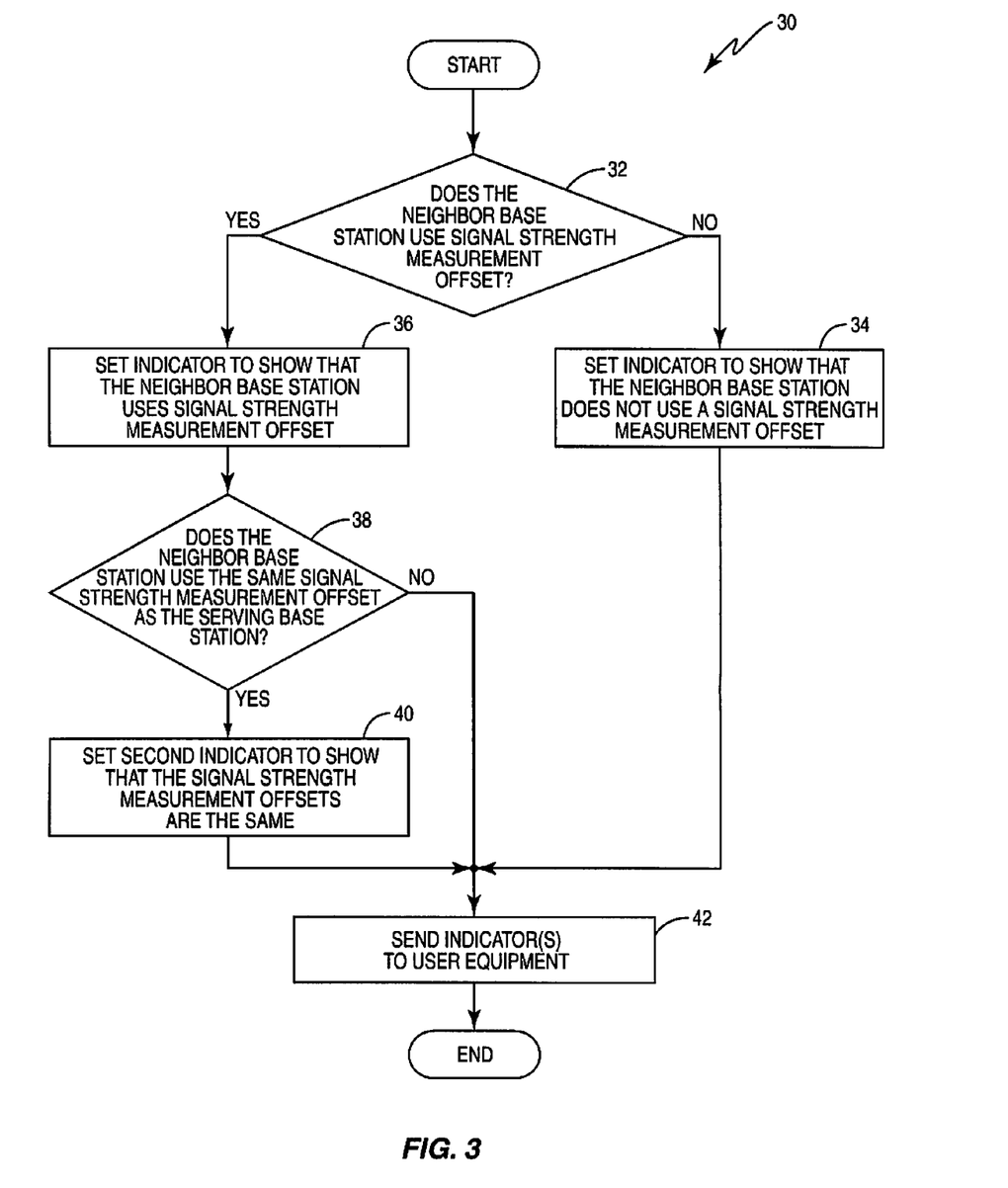
FIG. 3 is a flow chart illustrating a method by which a base station may perform the functions of the present invention according to one embodiment of the present invention.

FIG. 3 is a flow chart illustrating a method 30 of generating and sending the indicators to the MSs 60 according to one embodiment of the present invention. A BS 20 that is currently serving the MS 60 may perform the method 30.

Method 30 begins with the controller 22 determining whether a given neighbor BS 20 in a neighboring cell 12 uses signal strength measurement offsets (box 32). This information may, for example, be shared between the serving BS 20 and the neighbor BS 20 via the X2 interface. If the neighboring BS 20 does not use an offset, the controller 22 at the serving BS 20 may generate a first indicator indicating that the neighbor BS 20 does not employ an offset (box 34), and send the indicator to the MS 60 via transceiver 28 (box 42). Otherwise, the controller 22 will generate the first indicator to indicate that the neighbor BS 20 does employ an offset (box 36). In some embodiments, the controller 22 in the serving BS 20 may also determine whether the offset used by the neighbor BS 20 is the same offset that it uses (box 38). If not, the controller may send only the first indicator to the MS 60. Otherwise, the controller 22 may generate a second indicator to indicate that the offsets are the same and send them to the MS 60 via the transceiver 28 (box 42).

Sending the indicators to the MSs 60 may be accomplished using any means known in the art. However in one embodiment, seen in FIG. 4, the serving BS 20 transmits the indicators with the system information message 50 that is broadcast to the MSs 60. Particularly, the system information message 50 is divided into two parts—a fixed portion 52 and a dynamic portion 54. The fixed portion 52 of system information message 50 is transmitted in a predetermined manner. With LTE networks, such as LTE RAN 10, the fixed portion 52 corresponds to the BCH transport channel.

Figure 4:
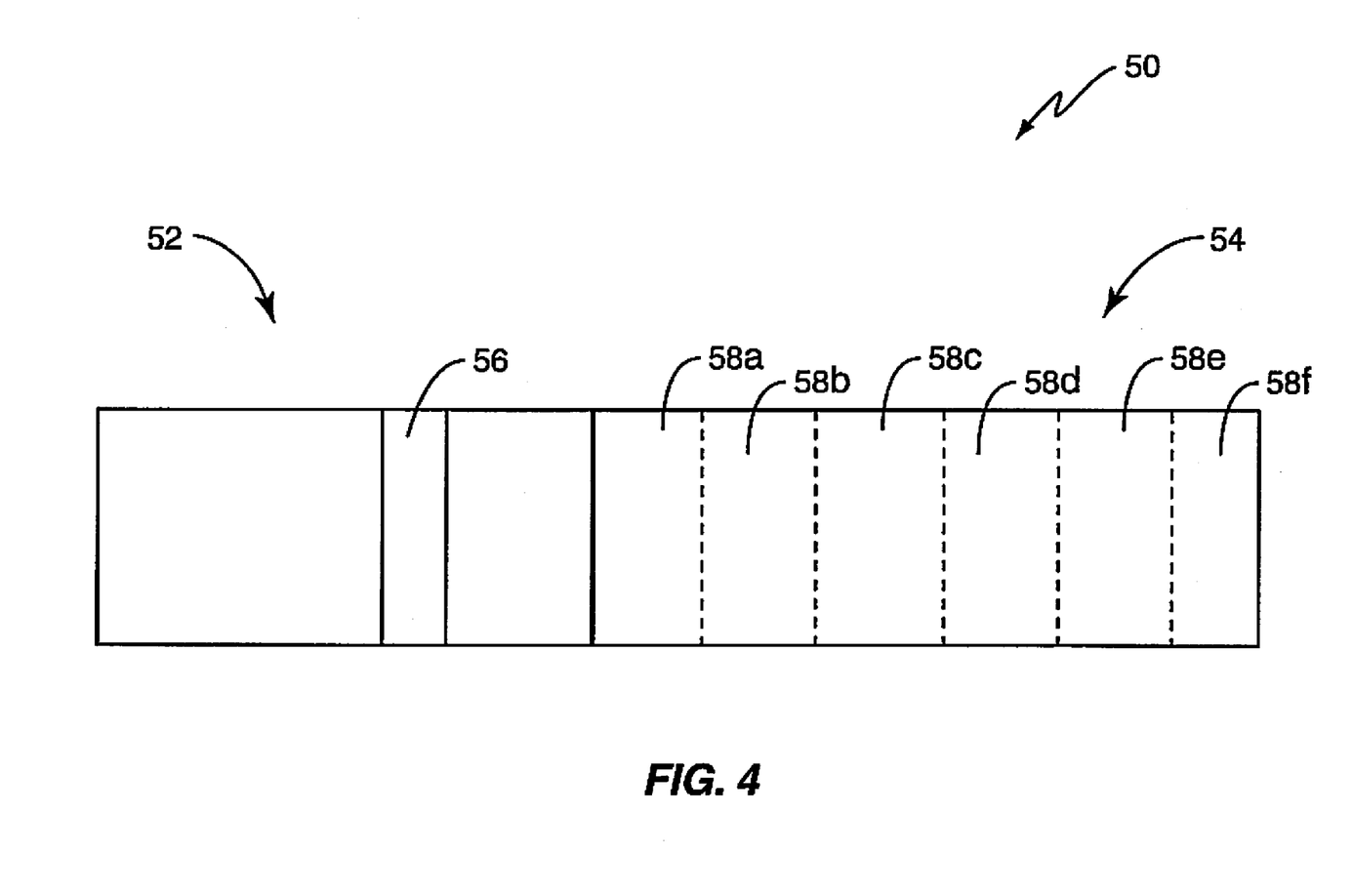
FIG. 4 illustrates an exemplary System information message message configured to carry an indicator received by the UE according to one embodiment of the present invention.

The broadcast information may comprise any information normally transmitted to MSs 60, but in this embodiment, the fixed portion 52 also comprises a slot 56 that carries one or both of the indicators generated by controller 22. Thus, a serving BS 20 configured according to the present invention may convey information regarding the signal strength measurement offset for its neighboring BSs 20, if any offset is used. Additionally, the serving BS 20 may identify the specific offset that should be used by the MSs 60 when measuring the neighboring BSs 20 signal strength. Therefore, in the case that offsets do not apply to any neighboring cells 12, there is no need for the MS 60 to read the neighboring cell broadcast information as part of carrying out the signal strength measurements.

In another embodiment, the BS 20 includes the indicators in the dynamic portion 54 of system information message 50. The dynamic portion 54 of system information message 50 is assumed to be transmitted using the Downlink Shared Channel (DL-SCH). Transmissions are similar to normal data transmissions and are repeated at substantially regular intervals. However, some of the information sent in the dynamic portion 54 of the system information message 50 may be time critical, while other information in the dynamic portion 54 is not. As such, the more time critical information may be repeated in the system information message 50 more often. According to one embodiment of the present invention, the indicators may be sent with the more time critical information.

To accomplish this, the present invention divides the dynamic portion 54 of the system information message 50 into a plurality of scheduling units 58, labeled as 58a-58f in FIG. 4. Generally, information corresponding to a first scheduling unit n is more time critical and should be repeated more often than information corresponding to second scheduling unit n+1. By way of example, scheduling unit 58a may be repeated approximately once every 80 ms and contain information that the MS 60 will need to read in order to camp on a control channel of the neighboring the cell 12. Scheduling units 58b-f, however, might be transmitted over intervals longer than 80 ms and contain information that is not as time critical as the information in scheduling unit 58a. Therefore, in one embodiment of the present invention, the controller 22 may include the indicators that indicate whether the neighboring BS 20 uses a signal measurement offset in scheduling unit 58a, and if so, whether that offset is the same offset that is used by the current BS 20.

The first and second indicators may comprise single-bit flags, for example, or may comprise a plurality of bits. If bits are used, the first and second indicators may be considered as a single indicator having a variety of values. For an indicator having two-bits, for example, a value of '0' (i.e., 00) might indicate that a given neighbor BS 20 does not use an offset. A value of '1' (i.e., 01) might indicate that the neighbor BS uses an offset, and thus, would require the MS 60 to read the BCH of the neighbor cell. A value of '2' (i.e., 10) might indicate that the neighbor BS 20 uses the same offset as does the current cell 12, and therefore, the MS 60 need not access the BCH of the neighboring cell to obtain the information. Other values and schemes are also as possible.

Figure 5:
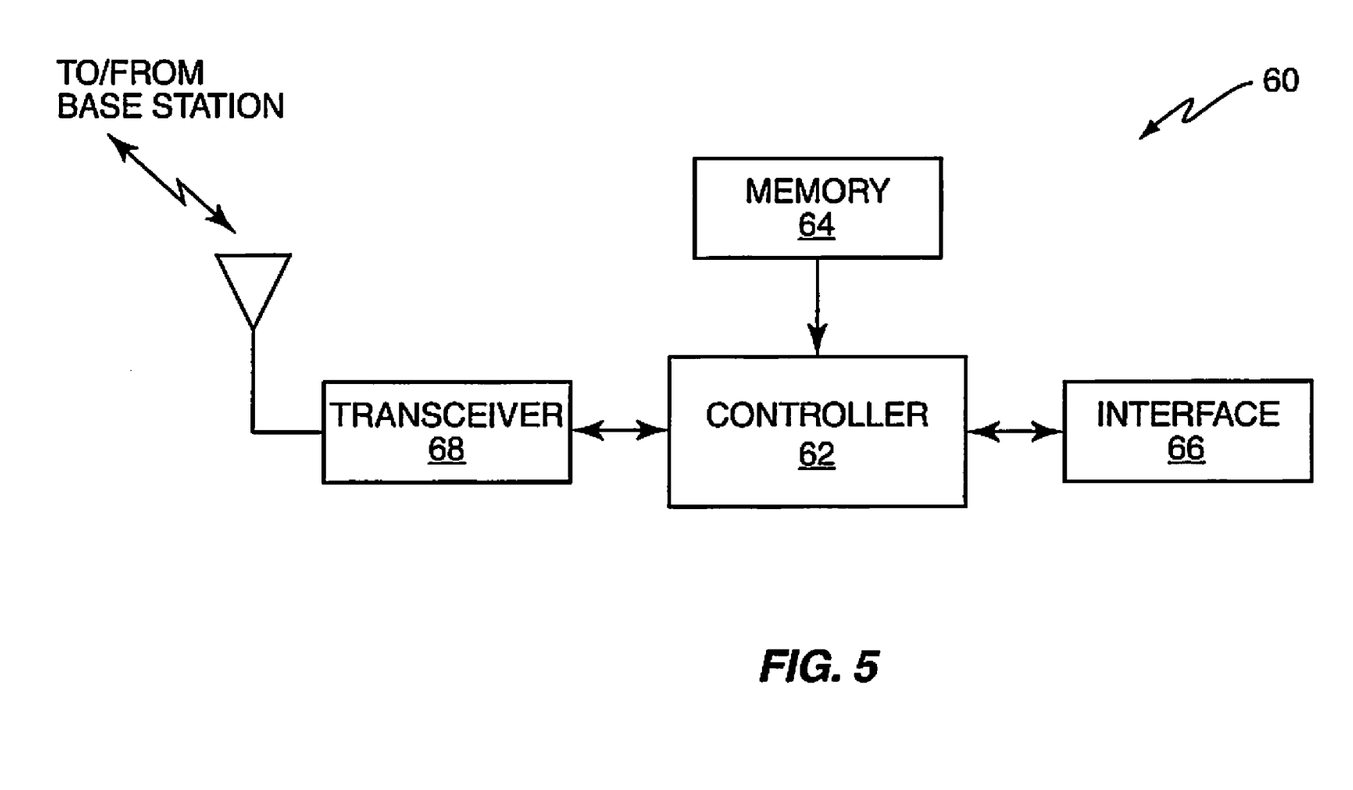
FIG. 5 is a block diagram illustrating some of the component parts of a UE configured according to one embodiment of the present invention.

FIG. 5 illustrates some of the components of an exemplary MS 60 configured to receive the indicators according to one embodiment of the present invention. Upon receiving the indicators, the MS 60 may skip reading the BCH of one or more neighboring BSs 20 to obtain signal measurement offsets.

As seen in FIG. 5, the MS 60 comprises a controller 62, memory 64, a user interface 66, and a transceiver 68 connected to an antenna. Controller 62 comprises one or more microprocessors that control the operation of the MS 60 according to program instructions and data stored in memory 64. The control functions may be implemented in a single microprocessor, or in multiple microprocessors as needed or desired. Memory 64 may include both random access memory (RAM) and read-only memory (ROM). Executable program instructions and data required for operation of the MS 60 are stored in non-volatile memory, such as EPROM, EEPROM, and/or flash memory, and may be implemented as discrete or stacked devices, for example. The user interface 66 may comprise a keypad, a display, and a variety of buttons or other controls to allow the user to interact with the MS 60. The transceiver 68 functions to transmit and receive data to and from the BSs 20 in the LTE RAN 10.

Figure 6:
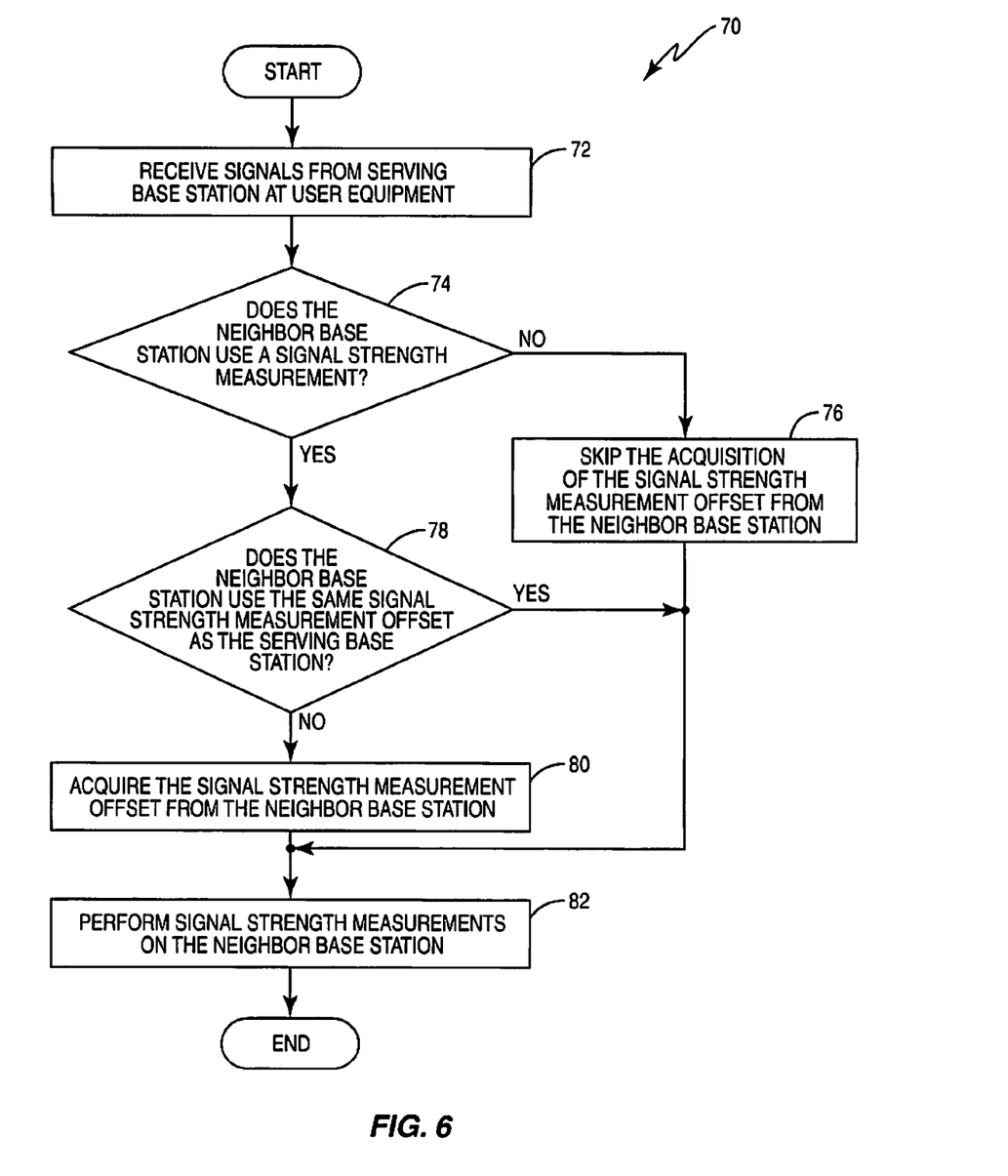
FIG. 6 is a flow chart illustrating a method by which a UE may perform the functions of the present invention according to one embodiment of the present invention.

FIG. 6 illustrates a method 70 by which a MS 60 may skip acquiring signal strength measurement offset information for a neighboring BS 20 according to one embodiment of the present invention. Method 70 begins when the MS 60 receives signals from the serving BS 20 (box 72). As previously described, the received signals may include one or more indicators that indicate whether the neighboring BSs 20 employ a signal strength measurement offset. If a first indicator indicates that the neighboring BS 20 does not use an offset (box 74), the MS 60 will skip reading the BCH of the neighboring BS 20 (box 76) and perform signal strength measurements using the information obtained in the most recent neighbor list. If the neighboring BS 20 does use an offset (box 74), the MS 60 will determine whether the neighboring BS 20 and the serving BS 20 use the same offset based on a second received indicator (box 78). If the two BSs 20 use the same offset, the MS 60 will skip the acquisition of the signal strength measurement from the neighboring BS 20 and instead, use the offset employed by the serving BS 20 to perform the signal strength measurements (box 82). Otherwise, the MS 60 will acquire the BCH of the neighbor BS 20 to obtain the offset (box 80) and perform the signal strength measurements using the acquired offset (box 82).

The MS 60 may receive the indicators while operating in an idle mode or a connected mode. A MS 60 in the idle mode may receive the system information message 50 from the BS 20 the cell 12 it is currently camping on. As seen in FIG. 6, it is enough for the serving BS 20 to include an indicator in the system information message 50 that no offset is broadcast in any of the neighboring cells. By providing the MS 60 with such an indication, the MS 60 can determine that there is no need to read neighboring cell broadcast information for the purpose of performing signal strength measurements on those BSs 20. As previously described, the indicators for idle MSs 60 may be included in the fixed portion 52 or a scheduling unit 58 of the dynamic portion 54 of the system information message.

For a MS 60 operating in a connected mode, the MS 60 can receive the indicators via dedicated signaling. For example, the indicators can be provided to the MS 60 by the serving BS 20 when configuring measurements in the current cell. That is, on each handover to a new cell 12, a MS 60 operating in the connected mode can either reuse a measurement configuration that it used in a previous cell, or receive a new measurement configuration from the LTE RAN 10 via dedicated signaling. The configuration of the measurements may be accomplished, for example, with Radio Resource Control (RRC) signaling.

Those skilled in the art will readily appreciate that the indicators may be sent to the MS 60 in other ways as well as those described previously. In another embodiment, for example, the serving BS 20 broadcasts the indicators to the MSs 60 over the broadcast channel. This approach requires the MS 60 to read the serving cell's 12 BCH while in connected mode, but can reduce the amount of signaling overhead compared to the dedicated signaling.

In another embodiment, the serving BSs 20 provide the indicators to the MS 60 in a central PDU in the Media Access Control (MAC) control layer. Particularly, the serving BS 20 may provide the indicators to the MS 60 as information in the MAC control PDU header. The MAC control PDU has less overhead than does RRC signaling, but requires tight interworking between RRC and MAC layers.

In another embodiment, the serving BS 20 provides the indicators on a L1/2 Shared Control Channel (SCCH) by using a special value of the SCCH fields. This method of delivering the indicators is very efficient in terms of signaling overhead, but the signaling used by the SCCH may be less reliable.

In another embodiment, the serving BS 20 provides the indicators to the MS 60 via dedicated signaling. In this embodiment, the BS 20 may send the indicators to be received by the MS 60 while it performs measurements in the connected mode.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of managing mobility in a wireless communication network, the method comprising:

determining, in a serving cell, whether a neighboring base station in a neighboring cell transmits a signal strength measurement offset; and sending a first indicator from the serving cell to user equipment to indicate whether the neighboring cell transmits a signal strength measurement offset; wherein sending the first indicator to user equipment comprises broadcasting the first indicator in system information message having a fixed part and a dynamic part;

dividing the dynamic part of the system information message into a plurality of scheduling units with a first scheduling unit being broadcast more frequently than a second scheduling unit; and including the first indicator in the first scheduling unit.

2. The method of claim 1, wherein the first indicator indicates that the neighboring cell does not broadcast a signal strength measurement offset.

3. The method of claim 1, further comprising including the first indicator in the fixed part of the system information message.

4. The method of claim 1, wherein sending the first indicator to user equipment comprises transmitting the first indicator in a dedicated message from the serving cell to the user equipment.

5. The method of claim 1, further comprising sending a second indicator to the user equipment to indicate that the serving cell and the neighboring cell use the same signal strength measurement offset.

6. The method of claim 1, wherein sending a first indicator to user equipment comprises one of transmitting the first indicator on a Broadcast Control Channel monitored by the user equipment, transmitting the first indicator to the user equipment in a Media Access Control Protocol Data Unit and transmitting the first indicator to the user equipment in a control message on a Shared Control Channel.

7. A serving base station in a wireless communication network, the base station comprising:

a controller configured to determine whether a neighboring base station in a neighboring cell transmits a signal strength measurement offset to user equipment; and a transceiver configured to send a first indicator from the serving base station to the user equipment to indicate whether the neighboring base station transmits a signal strength measurement offset; wherein the transceiver is configured to broadcast the first indicator to the user equipment in system information message having a fixed part and a dynamic part;

wherein the dynamic part of the system information message comprises a plurality of scheduling units with a first scheduling unit being transmitted more frequently than a second scheduling unit, and wherein the controller is configured to include the first indicator in the first scheduling unit.

8. The base station of claim 7, wherein the controller is configured to include the first indicator in the fixed part of the system information message.

9. The base station of claim 7, wherein the transceiver is configured to send the first indicator to the user equipment during handover of the user equipment.

10. The base station of claim 7, wherein the transceiver is configured to transmit a second indicator to the user equipment to indicate that the serving base station and the neighboring base station use the same signal strength measurement offset.

11. A method of managing mobility in a wireless communication network, the method comprising:

determining whether a first indicator received from a serving base station indicates that a signal strength measurement offset applies to a neighboring base station in a neighboring cell; and acquiring a signal strength measurement offset from the neighboring base station based on the first indicator;

wherein acquiring a signal strength measurement offset from the neighboring base station based on the first indicator comprises:

acquiring the signal strength measurement offset from the neighboring base station if the first indicator indicates that the neighboring base station uses a signal strength measurement offset; and skipping the acquisition of the signal strength measurement offset from the neighboring base station if the first indicator indicates that the neighboring base station does not use a signal strength measurement offset;

performing signal strength measurements on the serving base station using a first signal strength measurement offset;

wherein skipping the acquisition of the signal strength measurement offset comprises reusing the first signal strength measurement offset to perform signal strength measurements on the neighboring base station based on a second indicator received from the serving base station.

12. The method of claim 11, further comprising one of receiving the first indicator while in an idle mode, receiving the first indicator while in a connected mode, receiving the first indicator in a Media Access Control Protocol Data Unit and receiving the first indicator in a control message on a Shared Control Channel.

13. A user equipment in a wireless communication network, the user equipment comprising:

a transceiver configured to receive a first indicator from a serving base station that indicates whether a neighboring base station in a neighboring cell uses a signal strength measurement offset; and a controller configured to acquire the signal strength measurement offset from the neighboring base station based on the first indicator; wherein the controller is configured to:

acquire the signal strength measurement offset from the neighboring base station if the first indicator indicates that the neighboring base station uses a signal strength measurement offset; and skip the acquisition of signal strength measurement offset from the neighboring base station if the first indicator indicates that the neighboring base station does not use a signal strength measurement offset;

wherein the transceiver is further configured to receive a second indicator from the serving base station that indicates whether the serving base station and the neighboring base station use the same signal strength measurement offset.

14. The user equipment of claim 13, wherein the controller is configured to use the same signal strength measurement offset to perform the signal strength measurements on the neighboring base station based on the second indicator.

15. The user equipment of claim 13, wherein the transceiver is configured to receive the first indicator over a broadcast control channel or configured to receive the first indicator in system information message from the serving base station.

* * * * *

UNITED STATES PATENT AND TRADEMARK OFFICE
CERTIFICATE OF CORRECTION

PATENT NO.       : 8,200,228 B2
APPLICATION NO.  : 12/664363
DATED            : June 12, 2012
INVENTOR(S)      : Peisa et al.

It is certified that error appears in the above-identified patent and that said Letters Patent is hereby corrected as shown below:

In Column 2, Line 25, delete "bandwidth," and insert -- bandwidth), --, therefor.

In Column 2, Line 27, delete "cell." and insert -- cell). --, therefor.

In Column 3, Lines 35-36, delete "message message" and insert -- message --, therefor.

Signed and Sealed this
Sixth Day of November, 2012

David J. Kappos
*Director of the United States Patent and Trademark Office*